United States Patent Office 3,573,310
Patented Mar. 30, 1971

3,573,310
1-SUBSTITUTED DERIVATIVES OF 2-INDOLINONE
John William Van Dyke, Jr., Elkhart, Ind., assignor to Miles Laboratories, Inc., Elkhart, Ind.
No Drawing. Filed Sept. 28, 1967, Ser. No. 671,242
Int. Cl. C07d 51/70
U.S. Cl. 260—268           7 Claims

ABSTRACT OF THE DISCLOSURE 1-substituted derivatives of 2-indolinone of the formula:

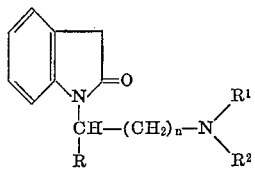

in which R is H or a lower alkyl of from 1 to 5 carbon atoms, and

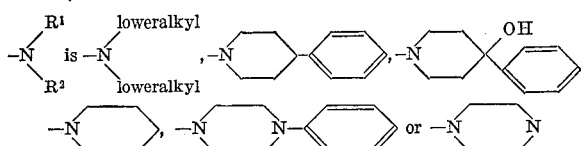

and pharmacologically acceptable salts thereof. These compounds are useful as analgetic agents.

---

This invention relates to a novel series of chemical compounds having beneficial properties. More particularly the invention relates to 1-substituted derivatives of 2-indolinone which possess advantageous pharmacological characteristics and a synthetic process for the preparation thereof.

Compounds of this invention may be represented by the general structural formula:

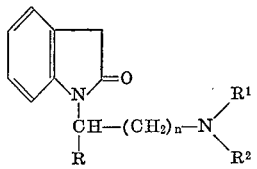

in which $n$ is an integer between about 1 and 5, R is a member selected from the group consisting of H, lower alkyl and aryl, and

is a member selected from the group consisting of N (lower alkyl)$_2$ and a heterocylcic radical of at least four members connected to the $(CH_2)_n$ group through the nitrogen atom of the

said nitrogen atom being a portion of the heterocyclic radical, the heterocyclic radical substituted at the four position with a substituent selected from the group consisting of

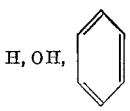

and combinations thereof. Lower alkyls mentioned herein generally have from 1 to 5 carbon atoms.

Compounds of this invention are conveniently prepared by reacting oxindole with a suitable haloalkylamine. This reaction may be represented by the chemical equation:

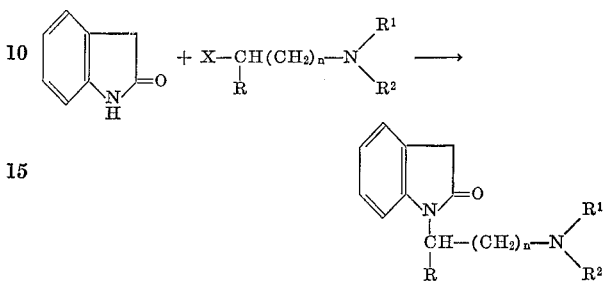

In this equation X is a halogen. The reaction is preferably carried out in the presence of a strong base, such as sodium hydride, sodium methoxide, sodium amide, potassium hydride, potassium methoxide, and similar compounds. The oxindole may be reacted with the strong base prior to the reaction with the haloalkylamine or the compounds of the invention may be formed in a single step reaction.

To prepare 1-substituted derivatives of 2-indolinone of the invention reactants may be heated in an autoclave to a temperature at which the reaction occurs at an advantageous rate. In an autoclave, a temperature between about 110° and 140° C. is preferred. The upper temperature is limited by possible decomposition of or other adverse effects to the reactants. However, the lower temperature is not considered critical.

The reactants are maintained at the reaction temperature in the autoclave for a period of time that is sufficient to allow completion of the reaction. Although this period is not considered critical, beneficial results have been obtained when the reaction conditions were maintained for between about 3 and 4 hours.

These components may also be prepared by refluxing the reactants described for similar lengths of time according to accepted chemical practices.

The reactants are advantageously combined in a solvent that is relatively inert under the reaction conditions used. For example, solvents such as benzene and xylene are suitable.

The novel compounds of this invention may be isolated as free bases and are preferably furnished as water-soluble acid addition salts. Beneficial pharmacologically acceptable salts suitable for incorporation in medications are formed. Satisfactory non-toxic, water-soluble, acid addition salts may be formed from mineral acids such as halogen acids or sulfuric acid, or from organic acids such as citric acid, maleic acid, oxalic acid and other similar acids. The preparation of these addition salts is described in the subsequent detailed examples and will not, therefore, be set forth at this point.

The compounds of the invention have demonstrated beneficial pharmacological properties. In particular, these compounds are useful as analgetic agents.

Medications may be conveniently prepared with these compounds as active ingredients using fillers, carriers, extenders and excipients generally used in pharmaceutical formulations. The active ingredient may be in the form of the free base and is preferably in the form of the pharmacologically acceptable acid addition salt. Medications may be prepared in solid or liquid states as tablets, capsules, suspensions, and similar dosage forms suitable for oral, subcutaneous, intraperitoneal, or other convenient means of administration. The free base or acid addition salt may be mixed with common diluents or tableting adjuncts such as cellulose powder, cornstarch, lactose, talc, and such, according to accepted manufacturing practices. Unit dosages (mg.) of active ingredient in the medication may be varied so that an adequate amount is present to provide desired therapeutic results without untoward side effects and to permit satisfactory variations in dosages administered. These medications are preferably prepared according to accepted pharmaceutical practices.

Analgesia was observed in mice with doses between about 25 and 55 mg./kg. of active ingredient. A medication including such dose in an aqueous solution was administered subcutaneously to the mice observed. Analgesia was determined in the test animals substantially by Haffner's artery clip method as described by Bianchi, C. and Franceschini, J. in "Experimental Observations on Haffner's Method for testing Analgesic Drugs," (1954), Brit. J. Pharmacol., 9, 280.

The toxic effects of the active ingredients of the invention were determined by administering graduated doses of each of the active ingredients in aqueous solutions intraperitoneally to a group of mice. An $LD_{50}$, the dose at which there was 50% mortality, was observed at doses between about 68 and 147 mg./kg.

The invention will be further understood by reference to the following examples which describe specific compounds of the invention and the processes for the preparation thereof. These examples are representative of some of the novel compounds of the invention and are not intended to limit the scope of the invention as defined in the appended claims.

EXAMPLE 1

1-[2-(4-phenyl-1-piperidyl)ethyl]-2-indolinone oxalate

A mixture of oxindole (10.5 g.), 4-phenyl-1-(2-chloroethyl)-piperidine hydrochloride (20.6 g.), and 8.5 g. of sodium methoxide was suspended in 50 ml. of benzene. The mixture was heated in an autoclave at 110°–120° C. for 3 hours. The mixture was filtered and the autoclave rinsed with $CHCl_3$. The red filtrate was concentrated to dryness. 25.2 g. of impure solid was obtained, 7.5 g. of oxalic acid was added to a methanolic solution of the free base. Ether was added and 10.5 g. of oxalate was obtained. The solid was recrystallized four times from methanol-2-propanol-ether to obtain an analytical sample (5 g., M.P. 200°–201° C.).

Analysis.—Calcd. for $C_{23}H_{26}N_2O_5$ (percent): C, 67.29; H, 6.39; N, 6.82. Found (percent): C, 66.54; H, 6.44; N, 6.65.

EXAMPLE 2

1-[3-(4-phenyl-1-piperidyl)propyl]-2-indolinone oxalate

A mixture of oxindole (11 g., 0.0826 mole), 4-phenyl-1-(3-chloropropyl)piperidine (19.6 g., 0.0826 mole), sodium methoxide (4.45 g.) and 150 ml. of benzene was heated for 3 hours at 120°–130° C. in an autoclave. The solid was filtered and washed with chloroform. The chloroform was removed under reduced pressure and the residue (24 g.) was chromatographed on a neutral alumina column. The column was eluted with ether and 14 g. of purple oil was obtained. The free base in ether was treated with 4.2 g. of oxalic acid in methanol. The salt was recrystallized twice from methanol-ethyl acetate-ether to give 8 g. of pure oxalate (M.P. 136°–138° C.).

Analysis.—Calcd. for $C_{24}H_{28}N_2O_5$ (percent): N (basic), 3.30; N (total), 6.60. Found (percent): N, (basic), 3.32; N (total), 6.60.

EXAMPLE 3

1-(3-dimethylaminopropyl-2-indolinone hydrochloride

To 11 g. (0.0826 mole) of oxindole in 150 ml. of dry benzene was added N,N-dimethyl-3-chloropropyl- amine hydrochloride (12.6 g., 0.08 mole) and sodium methoxide (10 g.). The mixture was heated for 3 hours at 110°–120° C. in an autoclave, the solid filtered and washed with chloroform. The solvent was removed under reduced pressure and the residue (17 g.) in ether was treated with excess HCl in 2-propanol. The salt was recrystallized from 2-propanol-ethyl acetate. Yield 8 g. (M.P. 183°–185° C.).

Analysis.—Calcd. for $C_{13}H_{19}ClN_2O$ (percent): N (total), 11.00; Cl, 13.90. Found (percent): N (total), 10.79; Cl, 13.66.

EXAMPLE 4

1-[3-(4-phenyl-1-piperazyl)propyl]-2-indolinone maleate

A mixture of oxindole (11 g., 0.0826 mole), 4-phenyl-1-(3-chloropropyl)piperazine (19.7 g., 0.0826 mole), sodium methoxide (5 g.) and 150 ml. of benzene was heated for 3 hours at 110°–120° C. in an autoclave. The solid was filtered, washed with chloroform and the filtrate concentrated under reduced pressure. The residue (27 g.) in ether was treated with 9.35 g. of maleic acid in methanol. The crude salt (25 g.) was recrystallized three times from 2-propanol-ether. Yield 10 g. (M.P. 148°–150° C.).

Analysis.—Calcd. for $C_{25}H_{29}N_3O_5$ (percent): N (basic), 6.20; N (total), 9.30. Found (percent): N (basic), 6.14; N (total), 9.16.

EXAMPLE 5

1-[1-methyl-2-(1-piperidylethyl]-2-indolinone oxalate

Oxindole (15 g.), N-(2-chloropropyl)piperidine hydrochloride (22.4 g.) and 12.2 g. of sodium methoxide were suspended in 75 ml. of dry benzene and the mixture heated at 130°–140° C. for 4 hours in an autoclave. The mixture was filtered and the autoclave rinsed with chloroform. The solvent was removed under reduced pressure and a red oil (22.5 g.) resulted. The liquid was dissolved in $CHCl_3$ and treated with 10% HCl. The acidic layer was separated and made basic with $Na_2CO_3$. The basic solution was extracted with $CHCl_3$, the $CHCl_3$ layer dried over $MgSO_4$ and the solvent removed. The residue (14 g.) was distilled and a fraction (11.5 g.) boiling at 136°/.2 mm.–155°/.3 mm. was collected.

The oxalate salt was prepared by adding oxalic acid to 10 g. of the free base in methanol. Ether was added and the crude oxalate oiled-out. The oxalate was recrystalized from methanol-ethyl acetate. Yield 6 g., M.P. 190°–192° C.

Analysis.—Calcd. for $C_{18}H_{24}N_2O_5$ (percent): C, 62.05; H, 6.94; N, 8.04. Found (percent): C, 61.54; H, 7.21; N, 7.89.

EXAMPLE 6

1-[2-(4-hydroxy-4-phenyl-1-piperidyl)ethyl]-2-indolinone hydrochloride

A mixture of oxindole (7.4 g., 0.056 mole), 4-phenyl-4-hydroxy-1-(2-chloroethyl)piperidine hydrobromide (18 g., 0.056 mole) and 6.1 g. (0.113 mole) of sodium methoxide was suspended in 50 ml. of benzene and the mixture heated in an autoclave at 110°–120° C. for 3 hours. The mixture was filtered and the autoclave rinsed with $CHCl_3$. The red filtrate was concentrated to dryness and the resulting red oil treated with aqueous HCl. The non-basic material was extracted with $CHCl_3$ and a large quantity (16.4 g.) of material insoluble in both $CHCl_3$ and water was obtained. The crude hydrochloride (15 g.) was recrystallized from 2-propanol and 10 g. of solid was obtained. The solid was sublimed (160°/.5 mm.) and the sublimed material recrystallized from 2-propanol. Yield 2.5 g., M.P. 234°–236° C.

Analysis.—Calcd. for $C_{21}H_{25}ClN_2O_2$ (percent): C, 67.64; H, 6.76; N, 7.51. Found (percent): C, 67.87; H, 6.82; N, 7.42.

What is claimed is:

1. A compound selected from the group consisting of compounds of the formula:

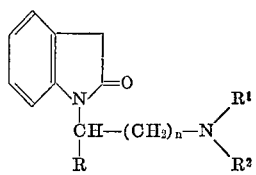

in which $n$ is an integer from 1 to 5, R is H, or a lower alkyl of from 1 to 5 carbon atoms and

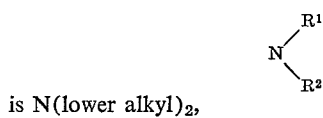

is N(lower alkyl)$_2$,

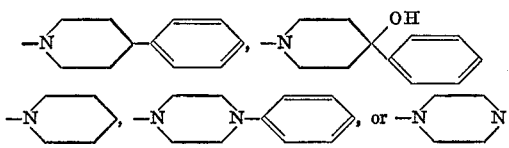

and pharmacologically acceptable salts thereof.

2. A compound according to claim 1 which is 1-[2-(4-phenyl-1-piperidyl)ethyl]-2-indolinone.
3. A compound according to claim 1 which is 1-[3-(4-phenyl-1-piperidyl)propyl]-2-indolinone.
4. A compound according to claim 1 which is 1-(3-dimethylaminopropyl)-2-indolinone.
5. A compound according to claim 1 which is 1-[3-(4-phenyl-1-piperazyl)propyl]-2-indolinone.
6. A compound according to claim 1 which is 1-[1-methyl-2-(1-piperidyl)ethyl]-2-indolinone.
7. A compound according to claim 1 which is 1-[2-(4-hydroxy-4-phenyl-1-piperidyl)ethyl]-2-indolinone.

References Cited
UNITED STATES PATENTS
3,091,568   5/1963   Bub _____ 167—55

ALEX MAZEL, Primary Examiner
R. V. RUSH, Assistant Examiner

U.S. Cl. X.R.
260—294, 325; 424—250, 267, 274